(12) United States Patent
Li et al.

(10) Patent No.: US 10,594,934 B2
(45) Date of Patent: Mar. 17, 2020

(54) VEHICLE DISPLAY

(71) Applicant: Bendix Commercial Vehicle Systems LLC, Elyria, OH (US)

(72) Inventors: Zheng Li, Irvine, CA (US); Andreas U Kuehnle, Villa Park, CA (US)

(73) Assignee: Bendix Commercial Vehicle Systems LLC, Elyria, OH (US)

(*) Notice: Subject to any disclaimer, the term of this patent is extended or adjusted under 35 U.S.C. 154(b) by 203 days.

(21) Appl. No.: 15/354,182

(22) Filed: Nov. 17, 2016

(65) Prior Publication Data
US 2018/0139384 A1    May 17, 2018

(51) Int. Cl.
*H04N 5/232* (2006.01)
*B60K 35/00* (2006.01)
*B60R 1/00* (2006.01)
*G06T 11/60* (2006.01)
*H04N 7/18* (2006.01)

(52) U.S. Cl.
CPC ......... *H04N 5/23238* (2013.01); *B60K 35/00* (2013.01); *B60R 1/00* (2013.01); *G06T 11/60* (2013.01); *H04N 5/23293* (2013.01); *H04N 7/181* (2013.01); *B60K 2370/21* (2019.05); *B60R 2300/30* (2013.01); *B60R 2300/303* (2013.01); *B60R 2300/304* (2013.01); *B60R 2300/607* (2013.01); *B60Y 2200/148* (2013.01)

(58) Field of Classification Search
CPC ........ B60Y 2200/148; B60R 2300/303; B60R 2300/30; B60R 2300/607; B60R 2300/304; B60R 1/00; B60K 2350/2013; B60K 35/00; H04N 7/181; H04N 5/23238; H04N 5/23293; G06T 11/60
See application file for complete search history.

(56) References Cited

U.S. PATENT DOCUMENTS

| 6,923,080 | B1 | 8/2005 | Dobler | |
| 7,145,519 | B2* | 12/2006 | Takahashi | G06K 9/00791 345/7 |
| 7,317,813 | B2 | 1/2008 | Yanagawa | |
| 7,432,799 | B2 | 10/2008 | Tsuboi | |
| 7,592,928 | B2* | 9/2009 | Chinomi | B60R 1/00 340/436 |

(Continued)

OTHER PUBLICATIONS lilliputweb.net "Specifications of UM-900/C/T," Technical Document, Unknown publication date, 3 pages, lilliputweb.net, City of Industry, California.

(Continued)

*Primary Examiner* — Philip P. Dang
(74) *Attorney, Agent, or Firm* — Cheryl Greenly; Brian Kondas; Eugene Clair

(57) ABSTRACT

A controller for synthesizing images for a vehicle display comprises a first image generator for generating a bird's eye image from a first set of cameras, the bird's eye image depicting the surroundings of a host vehicle and having a generally central portion. The controller includes a second image generator for generating a second image separate from the bird's eye image. The controller includes a synthesizer for synthesizing the bird's eye image and the second image for displaying the second image within the generally central portion of the bird's eye image.

14 Claims, 13 Drawing Sheets

(56) References Cited

U.S. PATENT DOCUMENTS

| | | | | |
|---|---|---|---|---|
| 7,840,032 B2* | 11/2010 | Ofek | ............... | G06T 3/4038 |
| | | | | 345/629 |
| 7,903,843 B2* | 3/2011 | Sawaki | ............... | G08G 1/168 |
| | | | | 382/104 |
| 8,085,990 B2* | 12/2011 | Ofek | ............... | G06T 3/4038 |
| | | | | 345/629 |
| 8,139,820 B2 | 3/2012 | Plante | | |
| 8,315,433 B2* | 11/2012 | Hsu | ............... | G06K 9/00805 |
| | | | | 382/103 |
| 8,411,245 B2 | 4/2013 | Lee | | |
| 9,041,806 B2* | 5/2015 | Baur | ............... | B60R 1/00 |
| | | | | 348/148 |
| 9,128,354 B2 | 9/2015 | Frashure | | |
| 9,264,672 B2* | 2/2016 | Lynam | ............... | B60R 1/00 |
| 9,319,637 B2* | 4/2016 | Lu | ............... | H04N 7/18 |
| 9,332,229 B2* | 5/2016 | Ishimoto | ............... | E02F 9/226 |
| 9,403,484 B2* | 8/2016 | Brandt | ............... | B60R 1/0612 |
| 9,446,713 B2* | 9/2016 | Lu | ............... | B60R 1/002 |
| 9,469,250 B2* | 10/2016 | Lynam | ............... | B60R 1/00 |
| 2006/0210114 A1* | 9/2006 | Oka | ............... | B60R 1/00 |
| | | | | 382/104 |
| 2009/0015675 A1* | 1/2009 | Yang | ............... | B60R 1/00 |
| | | | | 348/148 |
| 2010/0220190 A1* | 9/2010 | Hiroshi | ............... | B60R 1/00 |
| | | | | 348/148 |
| 2011/0050886 A1 | 3/2011 | Thompson | | |
| 2012/0162427 A1* | 6/2012 | Lynam | ............... | B60R 1/00 |
| | | | | 348/148 |
| 2013/0057689 A1 | 3/2013 | Barth | | |
| 2013/0300869 A1* | 11/2013 | Lu | ............... | H04N 7/18 |
| | | | | 348/148 |
| 2013/0314503 A1* | 11/2013 | Nix | ............... | G06K 9/00805 |
| | | | | 348/46 |
| 2014/0067206 A1* | 3/2014 | Pflug | ............... | B60W 10/04 |
| | | | | 701/41 |
| 2014/0088824 A1 | 3/2014 | Ishimoto | | |
| 2014/0111648 A1* | 4/2014 | Ishimoto | ............... | B60R 1/00 |
| | | | | 348/148 |
| 2014/0218531 A1 | 8/2014 | Michiguchi | | |
| 2014/0333729 A1* | 11/2014 | Pflug | ............... | G06T 15/20 |
| | | | | 348/47 |
| 2014/0375814 A1* | 12/2014 | Ishimoto | ............... | B60R 1/00 |
| | | | | 348/148 |
| 2015/0166062 A1* | 6/2015 | Johnson | ............... | B60W 30/12 |
| | | | | 701/41 |
| 2015/0175071 A1* | 6/2015 | Ishimoto | ............... | E02F 9/262 |
| | | | | 348/148 |
| 2015/0208041 A1* | 7/2015 | Wang | ............... | H04N 7/183 |
| | | | | 348/148 |
| 2015/0217690 A1 | 8/2015 | Mitsuta | | |
| 2015/0286878 A1 | 10/2015 | Molin | | |
| 2015/0296154 A1* | 10/2015 | Laroia | ............... | G02B 13/0065 |
| | | | | 348/262 |
| 2016/0026877 A1* | 1/2016 | Zhang | ............... | G06K 9/00798 |
| | | | | 348/148 |
| 2016/0026878 A1* | 1/2016 | Zhang | ............... | G06K 9/00798 |
| | | | | 348/148 |
| 2016/0101734 A1* | 4/2016 | Baek | ............... | B60R 1/00 |
| | | | | 348/148 |
| 2016/0165148 A1 | 6/2016 | Itoh | | |
| 2016/0253058 A1* | 9/2016 | Chak | ............... | G06F 3/0483 |
| | | | | 715/776 |

OTHER PUBLICATIONS

European Patent Office, "Written Opinion and Search Report of the International Searching Authority," Written Opinion and Search Report, dated Mar. 19, 2018, 8 pages, European Patent Office, Berlin Germany.

* cited by examiner

VEHICLE DISPLAY

BACKGROUND

The present invention relates to embodiments of a display that illustrate a bird's eye image of a tractor-trailer or other vehicle. Prior art bird's eye image displays show the vehicle as an object on the display screen with the views captured by the camera calibrated to display the surroundings of the vehicle as if the driver were viewing the vehicle from above. The vehicle graphic itself is generally represented by a shape similar to the vehicle and may have markings to resemble the top view or roof of the vehicle. The shape is centrally located in the display to help the driver with orienting himself or herself with respect to the camera views. The shape is generally an unused space on the display screen.

FIG. 1 illustrates a prior art display 100. The screen 104 is used to display a surround view of a vehicle. The vehicle image 102 is shown in the shape of the vehicle as would be seen from an overhead camera view. No other information about the vehicle 102 is shared on the display 100. In some prior art displays, information about the vehicle would be shown by splitting the screen 104 into two portions, one portion showing the surround view of the vehicle and the other portion showing information about the vehicle or the view from a different camera. Splitting the screen 104 into two screens causes the information to be less comprehensible as the images must become smaller. There is a desire to improve utilization of the display.

SUMMARY

Various embodiments of a controller for synthesizing images for a vehicle display comprise a first image generator for generating a bird's eye image from a first set of cameras, the bird's eye image depicting the surroundings of a host vehicle and having a generally central portion. The controller includes a second image generator for generating a second image separate from the bird's eye image. The controller also includes a synthesizer for synthesizing the bird's eye image and the second image for displaying the second image within the generally central portion of the bird's eye image.

In accordance with another aspect, various embodiments of a method for synthesizing an image comprise receiving a bird's eye view of a surrounding of a vehicle from a first set of cameras and synthesizing the bird's eye view to create a bird's eye image having a generally central portion. The method also includes receiving a second view separate from the bird's eye view and synthesizing the second view to create a second image. The method includes displaying the second image within the generally central portion of the bird's eye image.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

Figure 1:
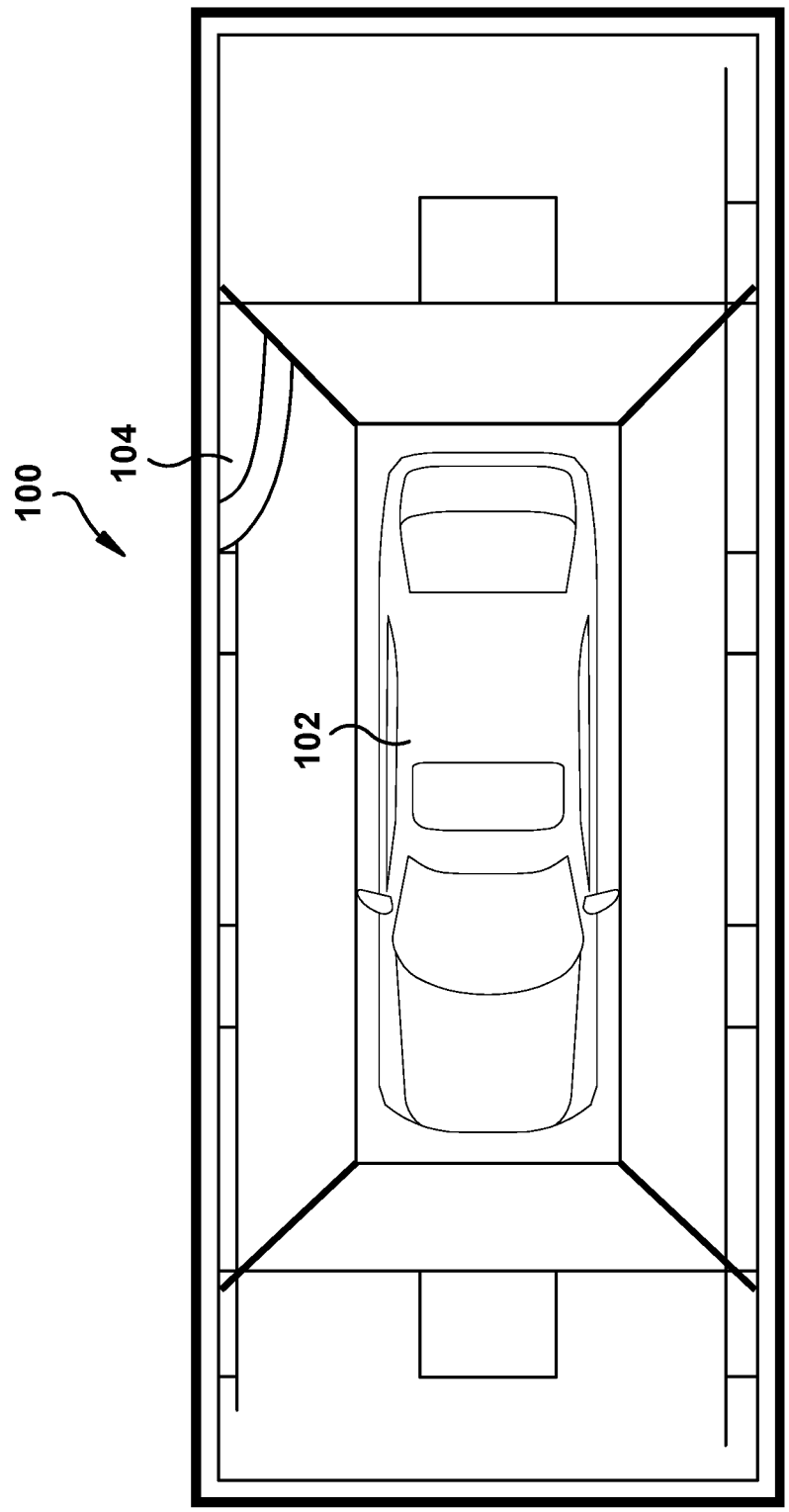
FIG. 1 illustrates a prior art display.
Figure 2:
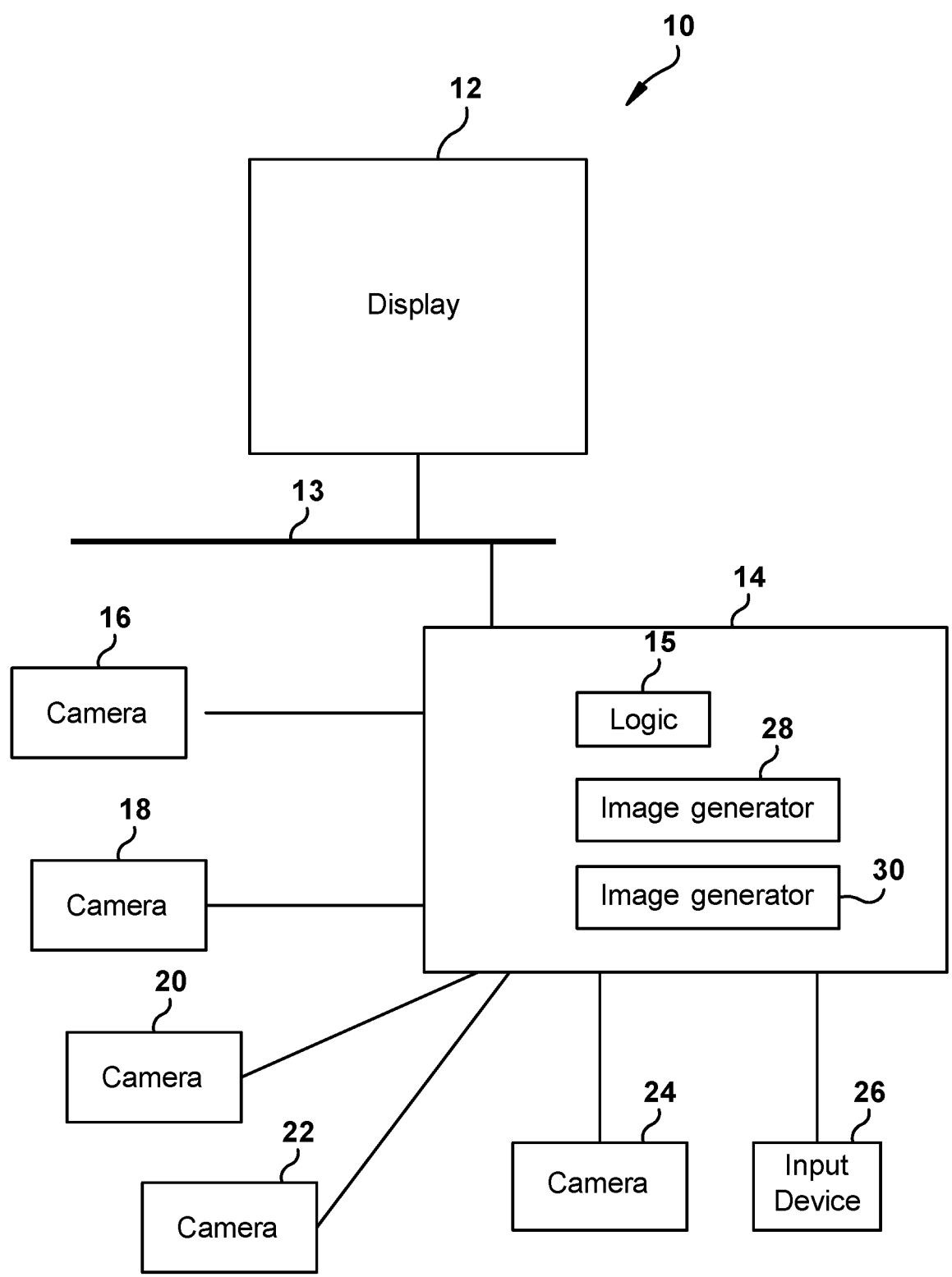
FIG. 2 illustrates a system according to one example of this invention.

FIG. 2 illustrates a surround view system 10 according to one example. The surround view system 10 is installed on host vehicle, such as a car, bus, truck or tractor-trailer vehicle. The surround view system 10 captures a bird's eye view of the host vehicle on which the surround view system 10 is installed, in addition to other features, as will be explained.

The surround view system 10 includes at least one forward looking camera 16, intended for installation on the front of the body of the host vehicle. The surround view system 10 also includes a rear camera 18, intended for installation on the rear of the host vehicle. The surround view system 10 also includes a left side camera 20 and a right side camera 22 that may be mounted on the left and right sides of the host vehicle. The cameras may be mounted on the roof of the vehicle, along the perimeter of the vehicle, on the hood of the vehicle or other location that affords a view looking downward and around the host vehicle. The cameras 16, 18, 20, 22 may have a fish eye lens to facilitate capturing the bird's eye view.

The surround view system 10 may also include at least one alternate camera 24. The at least one alternate camera 24 may be a driver facing camera, an undercarriage camera, a panorama camera, a cargo or passenger space camera or other camera that captures another view of the host vehicle or around the host vehicle that is not typically used to display a bird's eye image of a vehicle.

The surround view system 10 includes a display 12. The display 12 is located in the host vehicle in view of a driver. The display 12 may be an UM-900/T display from Lilliput Electronics Inc. of City of Industry, Calif. The display 12 is in electrical communication with a surround view controller 14 either directly, wirelessly, through a vehicle communications bus 13 or other communications means. The vehicle communications bus 13 may be used to transmit or receive information from other controllers on the host vehicle.

The surround view controller 14 includes a processor with control logic 15 for controlling the display 12 and receiving information from the cameras 16, 18, 20, 22, 24. The control logic 15 compiles each of the views from cameras 16, 18, 20, 22 in a first image generator 28 to create the bird's eye view image. The control logic 15 compiles the view from alternate camera 24 and/or other information from other systems on the vehicle in a second image generator 30. The control logic 15 synthesizes the information from the first image generator 28 and the second image generator 30 to display a unified image on the display 12. A display screen of the display 12 is transformed to display the unified image.

The control logic 15 may include volatile, non-volatile memory, solid state memory, flash memory, random-access memory (RAM), read-only memory (ROM), electronic erasable programmable read-only memory (EEPROM), variants of the foregoing memory types, combinations thereof, and/or any other type(s) of memory suitable for providing the described functionality and/or storing computer-executable instructions for execution by the control logic 15. The control logic 15 can save images to a memory location for later retrieval. The controller 14 may also include functionality for lane departure warning and other vehicle systems.

The surround view controller 14 may receive input from a driver input device 26. Alternatively, the driver input device 26 may communicate directly with the display 12.

The driver input device 26 is used by the driver when he or she desires to change the view as shown on the display 12.

Therefore, a controller for synthesizing images for a vehicle display comprise a first image generator for generating a bird's eye image from a first set of cameras, the bird's eye image depicting the surroundings of a host vehicle and having a generally central portion. The controller includes a second image generator for generating a second image separate from the bird's eye image. The controller also includes a synthesizer for synthesizing the bird's eye image and the second image for displaying the second image within the generally central portion of the bird's eye image.

Therefore, a system for synthesizing and displaying an image comprises a first set of cameras for capturing a bird's eye view of a surrounding of a vehicle. The system includes a controller capable of synthesizing the bird's eye view to create a bird's eye image having a generally central portion and synthesizing a second image. The second image is placed in the generally central portion of the bird's eye image to create a unified image. The system also includes a display for displaying the unified image.

Figure 3:
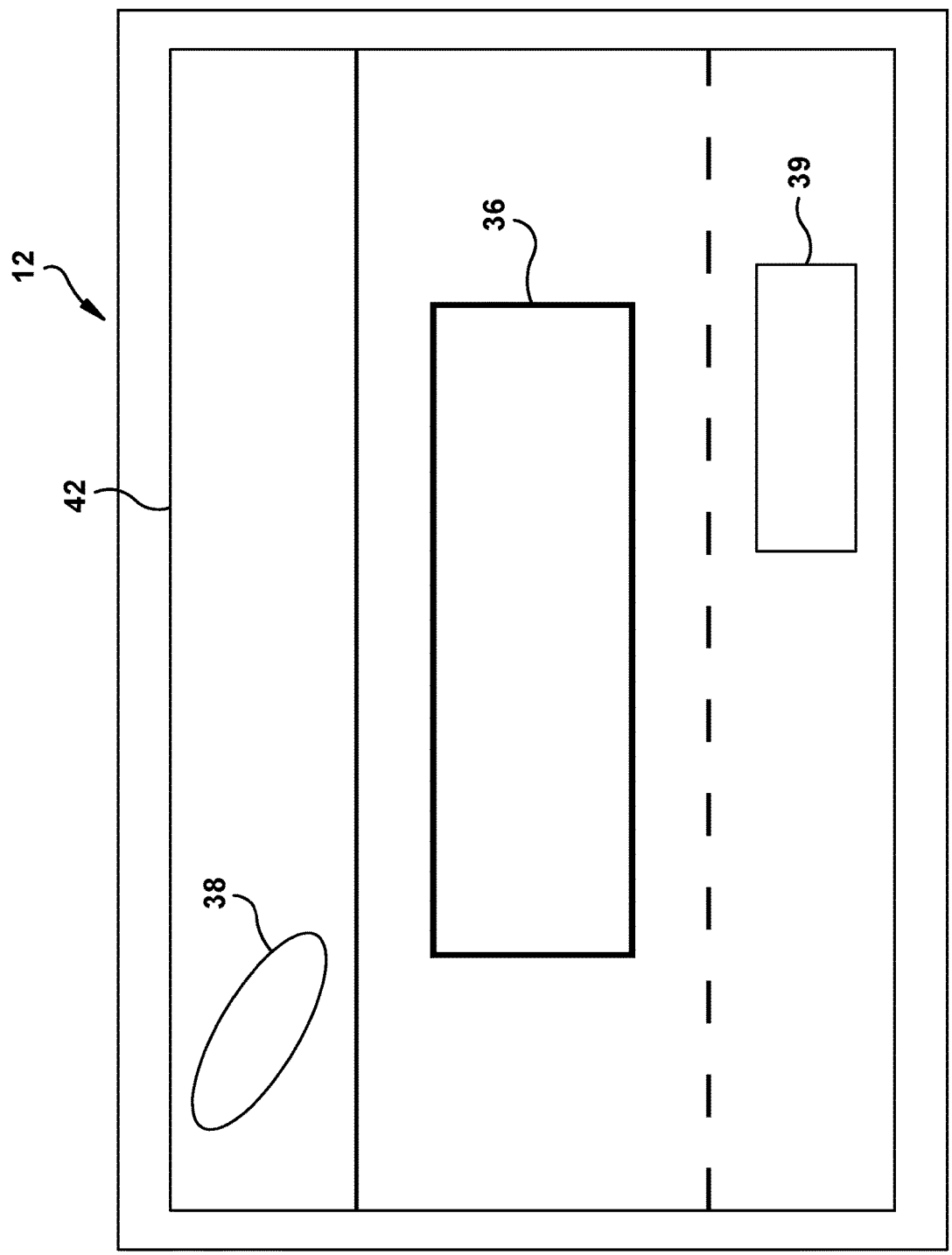
FIGS. 3-12 illustrate displays configured according to examples of this invention.

FIG. 3 illustrates a close up view of the screen 42 of display 12, according to one example of the invention. Display 12 shows a bird's eye image around the host vehicle having the surround view system 10. The control logic 15 receives views acquired by the cameras 16, 18, 20, 22 as arranged on the host vehicle. The cameras 16, 18, 20, 22 may be configured to capture views simultaneously and at the same frame rate. The fields of view of the cameras 16, 18, 20, 22 may and typically do have some overlap. The first image generator 28 transforms and stitches together views captured by the cameras 16, 18, 20, 22 to build the bird's eye image based on the known relative position between the cameras 16, 18, 20, 22. The first image generator 28 then displays the bird's eye image on the screen 42. Detected objects, such as a pedestrian object 38 and vehicle object 39, may also be shown on the screen 42. In this example, the pedestrian object 38 and vehicle object 39 are shown as outlines, but they may also be shown as icons, text or symbols.

The first image generator 28 creates a generally central portion 36 relative to which the bird's eye image as synthesized from cameras 16, 18, 20, 22 is oriented. In the prior art, a representation of the host vehicle roof would be displayed. In this example, the generally central portion 36 is used by the second image generator 30, as will be explained. In FIG. 3, the generally central portion 36 is left as a blank space approximating the size of unviewable space of the bird's eye image. Unviewable space is created due to the placement of the cameras 16, 18, 20, 22 in relationship with the body of the host vehicle. The generally central portion 36 may be generally rectangular in shape, indicating a larger host vehicle like a tractor-trailer or a bus, or the generally central portion 36 may be squarer in shape, indicating a smaller host vehicle like a tractor only or a car. While the bird's eye image on screen 42 may change as the object(s) move with respect to the host vehicle, the generally central portion 36 corresponds to the unviewable space of the bird's eye image and remains devoid of information or graphics. This unified image is displayed to the driver.

Figure 4:
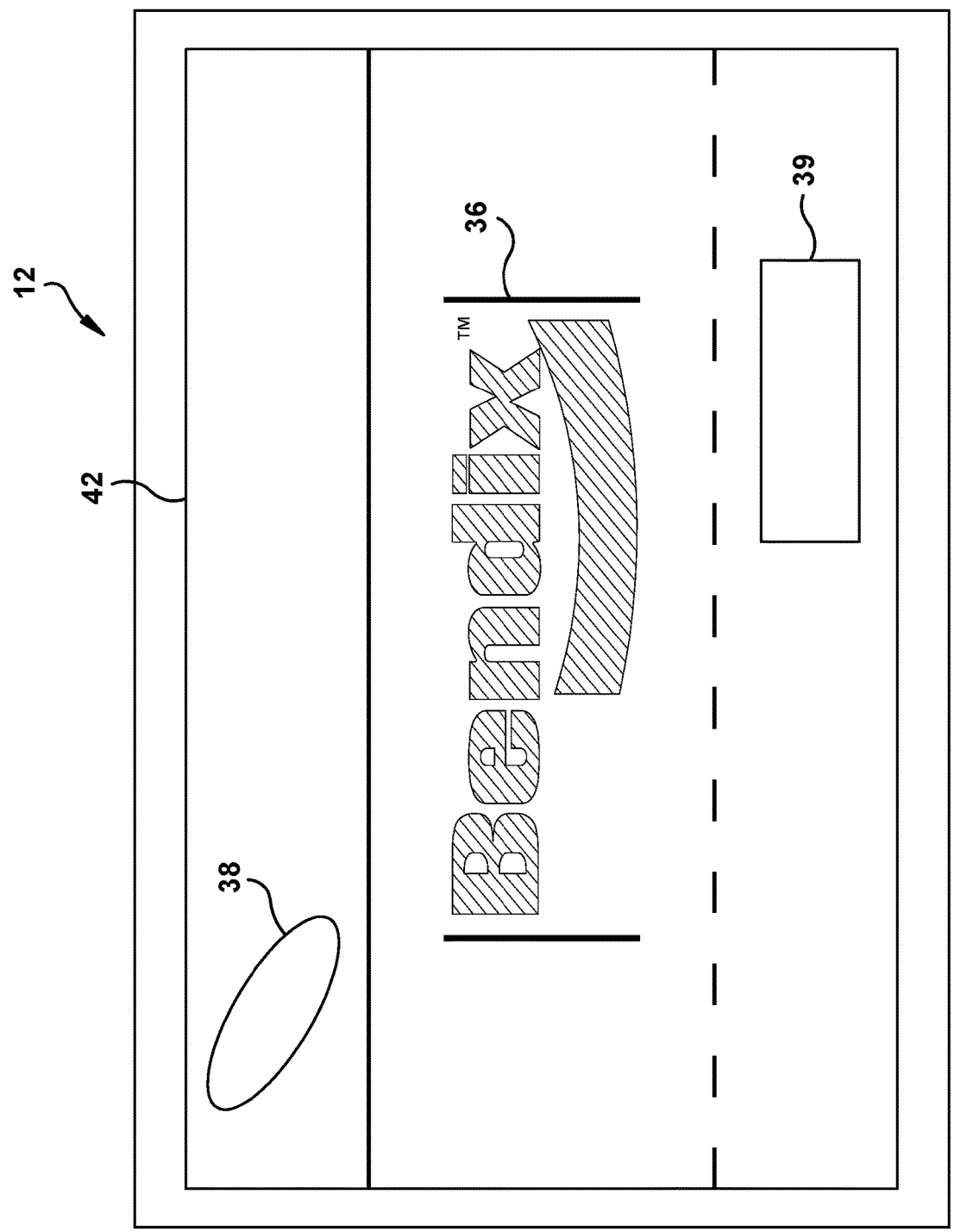

In FIG. 4, the second image generator 30 is used to display a company logo in the generally central portion 36. By displaying the company logo in this manner, the control logic 15 synthesizes the images from the first image generator 28 and the second image generator 30 on the screen to provide practical information about the manufacturer of the surround view system 10 as the unified image. This unified image uses the otherwise unviewable space, which is the generally central portion 36 on the screen 42 created by the first image generator 28.

Figure 5:
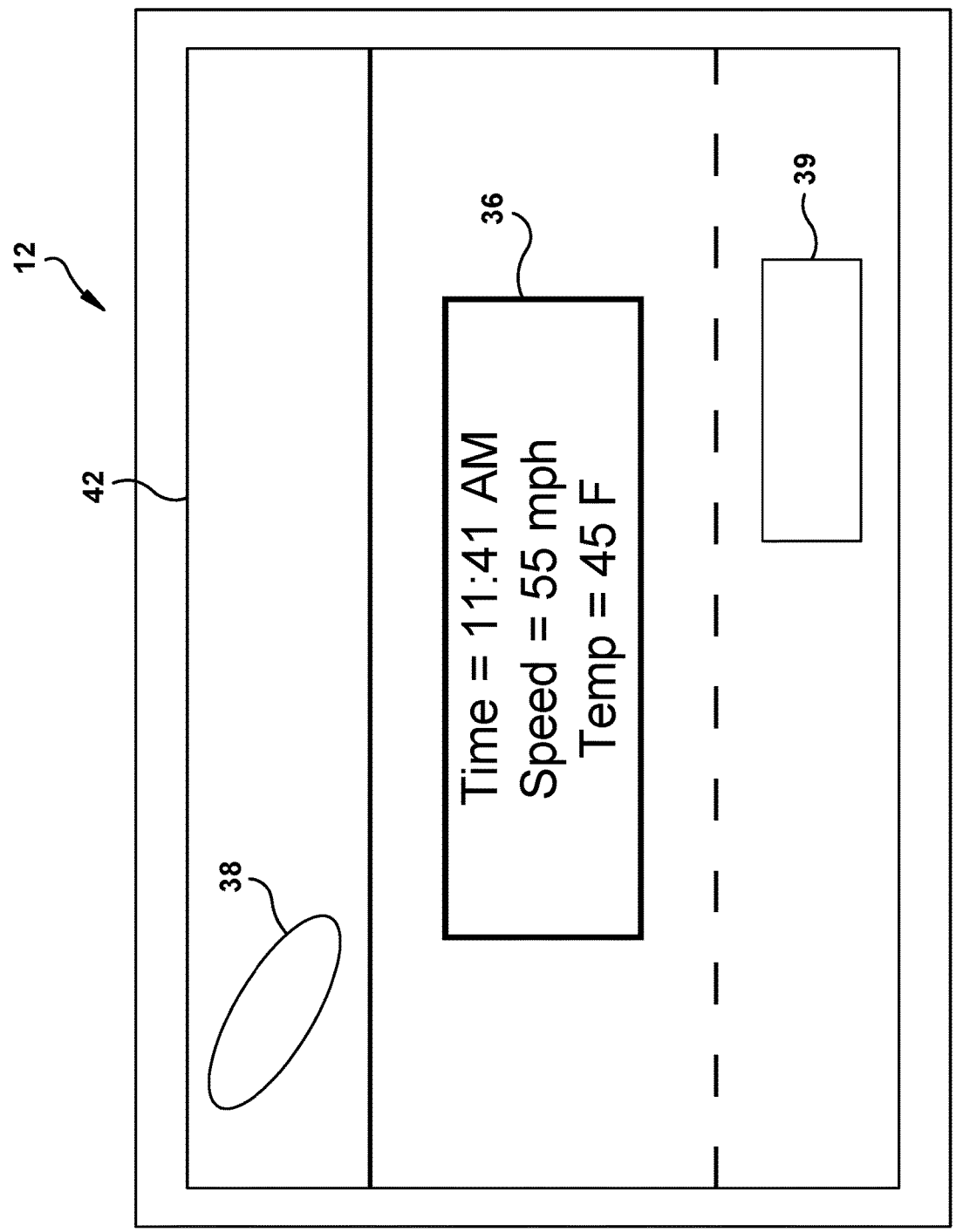

In FIG. 5, the first image generator 28 is used to show the bird's eye image of the host vehicle on screen 42. The generally central portion 36 is now used to display an image of the current time, the vehicle speed and the ambient temperature. The vehicle speed information may be received by the control logic 15 from another controller on the host vehicle via the vehicle serial communications bus 13. The driver may use driver input device 26 to cycle through different information to be displayed in the generally central portion 36. One display selection may include multiple points regarding current vehicle running information, as shown in the unified image of FIG. 5. Another selection may present information individually, such as vehicle speed, ambient temperature, vehicle system activity and the like.

Utilization of generally central portion 36 in the manner disclosed precludes the second image generator 30 from overlapping information onto the bird's eye image generated by the first image generator 28. Displaying text over any part of the image on the screen 42 may cause the driver to miss important information, such as pedestrian object 38 and vehicle object 39. In addition, the full portion of the screen 42 is used for the bird's eye image rather than splitting the screen 42 into two smaller images as in the prior art.

Figure 6:
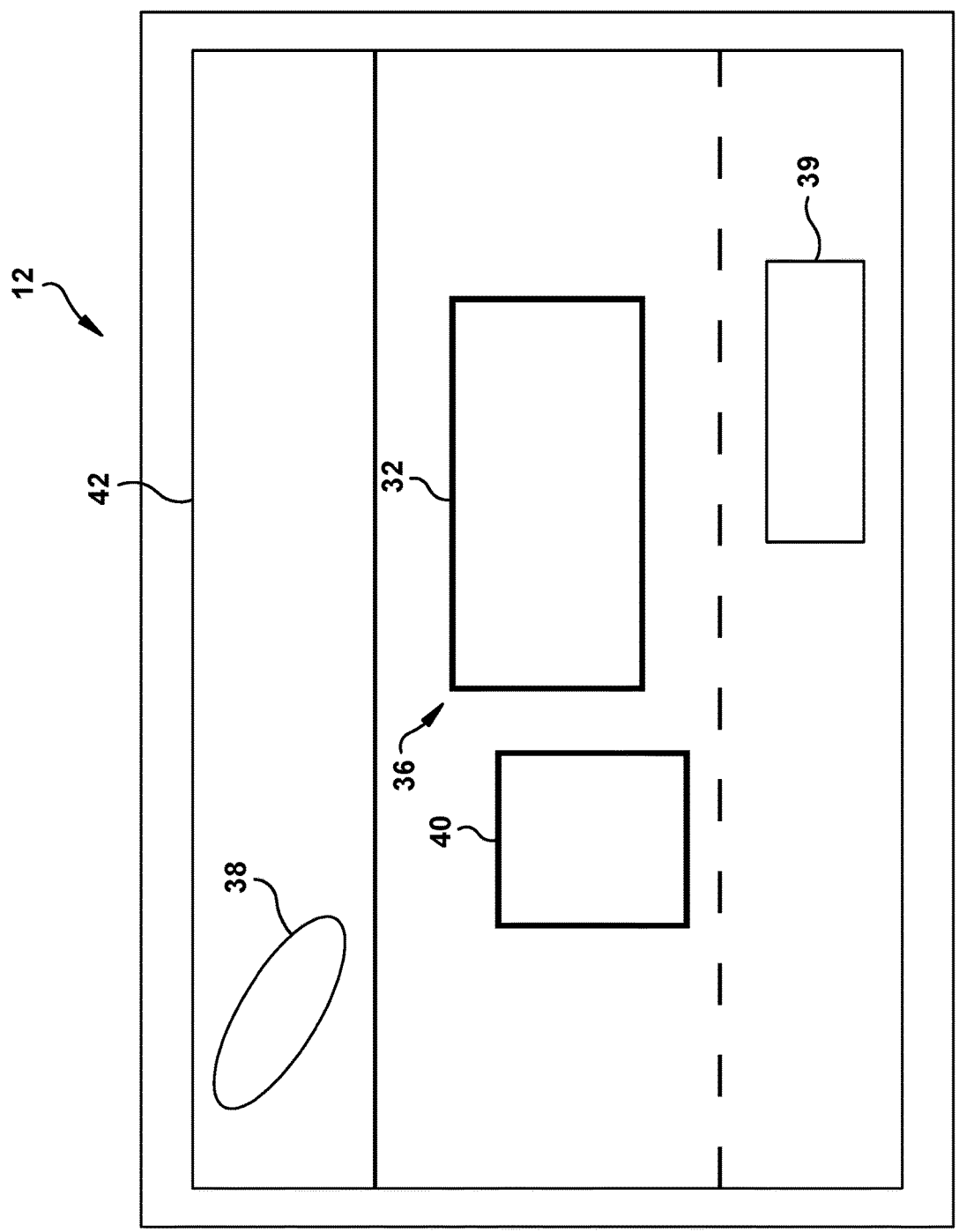

In FIG. 6, the first image generator 28 is used to show the bird's eye image of the host vehicle on screen 42. The host vehicle in this example is a tractor-trailer vehicle. The bird's eye view image will change as the host vehicle moves or as the object(s) move in relationship to the host vehicle. The generally central portion 36 is split into two segments, a first, or tractor, segment 40 and a second, or trailer, segment 32. The tractor segment 40 and trailer segment 32 approximate the location of the tractor and trailer with respect to the camera view and may remain stationary on the screen 42 as the bird's eye image changes. Alternatively, the tractor segment 40 may move on the screen 42 when the controller 14 receives information that the tractor is articulating from the trailer.

In this example of a unified image, the tractor segment 40 is shown as moving to the left because the controller 14 received information from another controller or sensor that the host vehicle was turning to the left. Display 12 is used to indicate visually to a driver that his maneuvers may bring his vehicle close to vehicle object 39.

In another example of a unified image, the generally central portion 36 may display information about the vehicle object 39, such as the size of the detected object, the distance of the detected object from the host vehicle and the direction of travel of the detected object.

Figure 7:
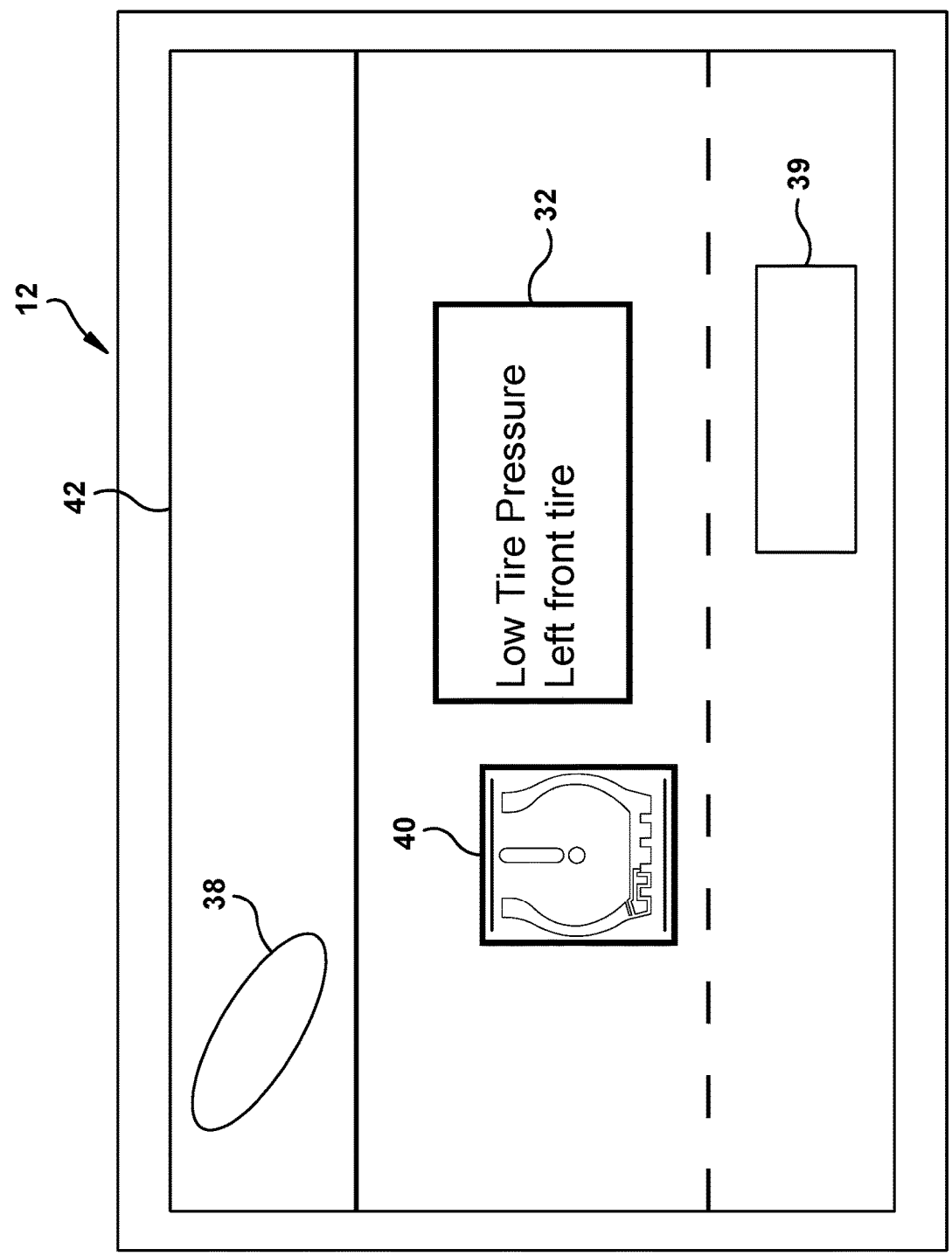

In FIG. 7, the first image generator 28 is used to show the bird's eye image of the host vehicle on screen 42. In this example, the tractor of the host vehicle is articulating from the trailer, similar to FIG. 6. The generally central portion 36 is now used to display an image of a vehicle warning as received from the second image generator 30. The controller 14 may generate the warning itself or may receive the warning from another controller via the vehicle serial communications bus 13. In this example, a low tire pressure warning and location of the warning is displayed to the driver in the generally central portion 36. The warning may be displayed the entire time the warning is active or multiple warnings may be cyclically displayed according to their priority. A color change of the generally central portion 36 may help the driver identify the priority of the warning. In the case of a low tire pressure warning, the background of the trailer segment 32 may turn yellow.

The tractor segment 40 may be used to visually display a graphic of the warning since the area of the tractor segment 40 is less than the area of the trailer segment 32. In this example of a unified image, the graphic of a tire pressure warning is shown on the tractor segment 40 in approximately the location of the tire pressure warning, the left front tire. The trailer segment 32 may continue to provide details about the warning since it has larger spatial area on the screen 42.

The driver may use driver input device 26 to cycle through different displays, one of which would include active warnings and fault codes of the vehicle. In the case of warnings and alerts, the driver may use driver input device 26 to cycle through warnings, but the control logic 15 may default to displaying the warning(s) once no input is received from the driver input device 26 instead of remaining on a vehicle informational or alternate camera display.

Figure 8:
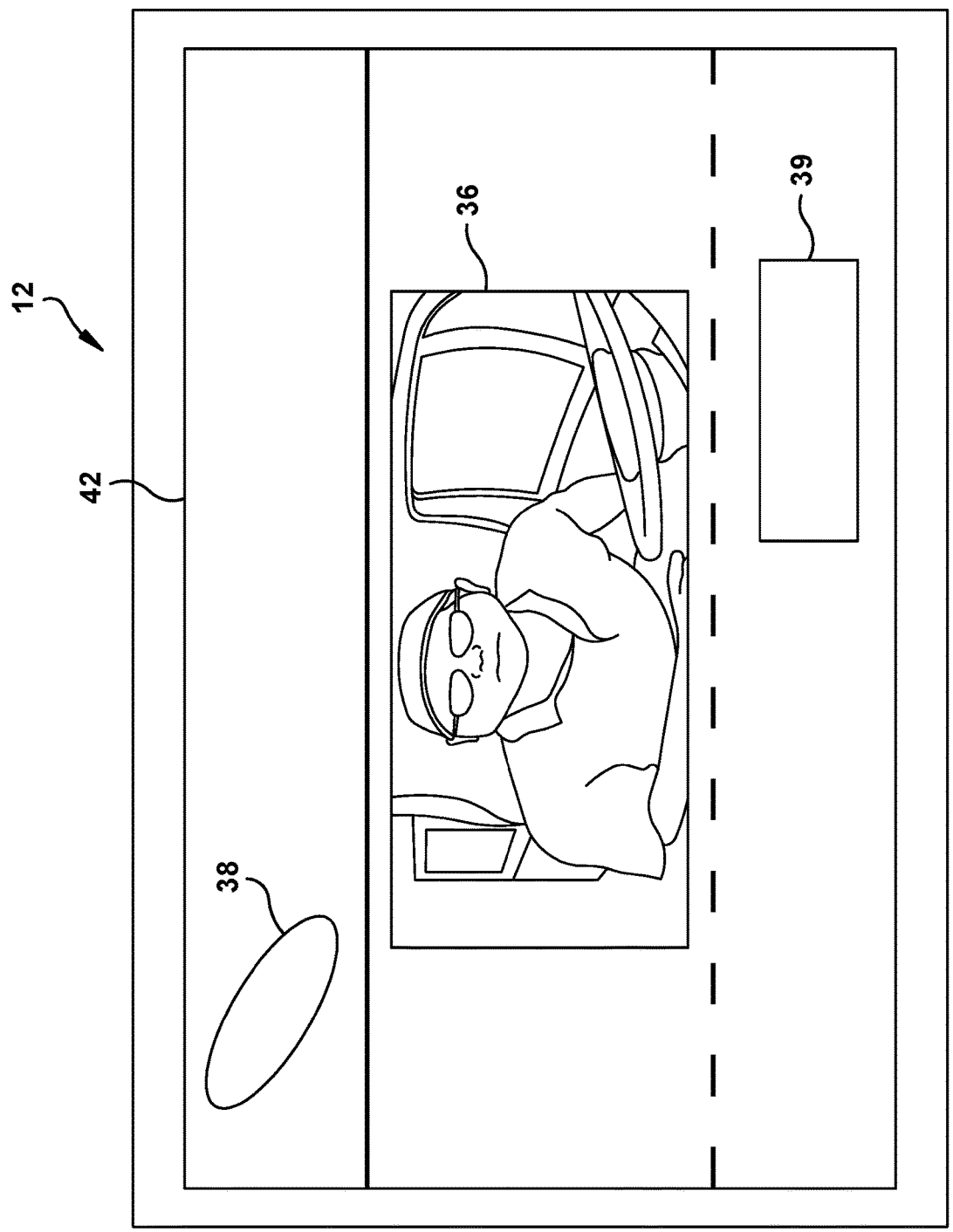

In FIG. 8, the first image generator 28 is used to show the bird's eye image of the host vehicle on screen 42. Generally central portion 36 can be used to display an image from another camera on the host vehicle. The driver may use the driver input device 26 to choose which camera view to display in generally central portion 36. Alternatively, the display may cycle through different views from different active cameras. In the unified image of FIG. 8, the second image generator 30 uses the image from the alternate camera 24 to show a driver facing camera image in generally central portion 36.

In yet another example, the generally central portion 36 may provide a space to display a live video link to an external party or to receive transmitted content.

Figure 9:
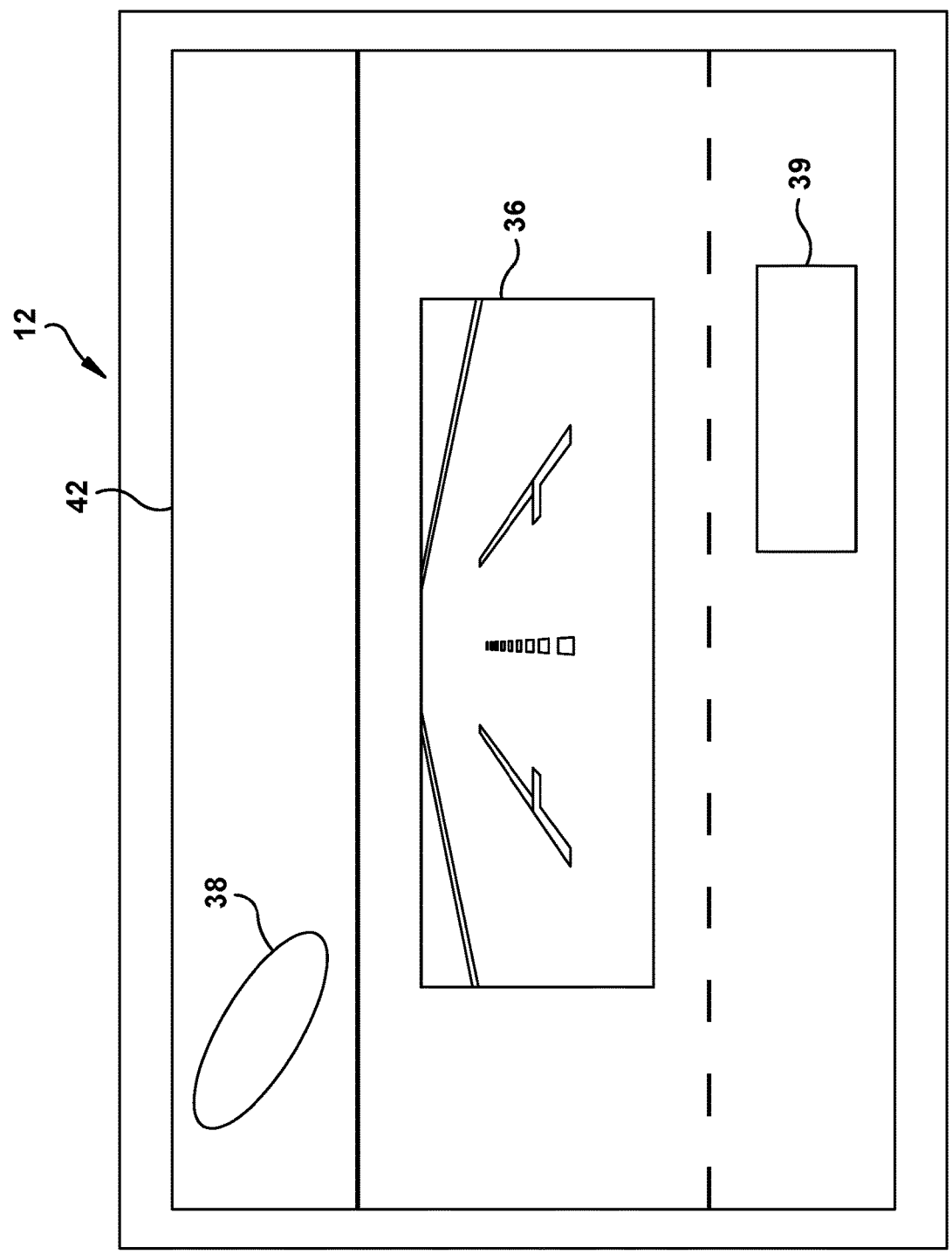

In FIG. 9, the first image generator 28 is used to show the bird's eye image of the host vehicle. Generally central portion 36 can be used to display yet another image from another alternate camera on the host vehicle. The driver may use the driver input device 26 to choose which camera image to display in generally central portion 36. The display 12 may automatically cycle through different views from different cameras. The display 12 may auto-configure to match vehicular conditions. In one example, the control logic 15 may receive information regarding the host vehicle being in a reverse gear. As shown in the unified image of FIG. 9, the second image generator 30 will then use the image from the alternate camera 24 in response to the vehicle being in reverse gear to show a backup camera image in the generally central portion 36.

Additional information may be gathered and displayed by the second image generator 30. In one example, the driver uses the driver input device 26 to select an image from one of the cameras 16, 18, 20, 22, 24 on which the driver wants to zoom in on an area of concern. The alternate camera 24 may be a camera arranged to determine the height of the vehicle and to generate warnings regarding upcoming bridge clearances. In addition to the driver using the driver input device 26 to change what is displayed in the generally central portion 36, the second image generator 30 may change what is displayed based on the vehicle speed, time of day or state of the driver.

Figure 10:
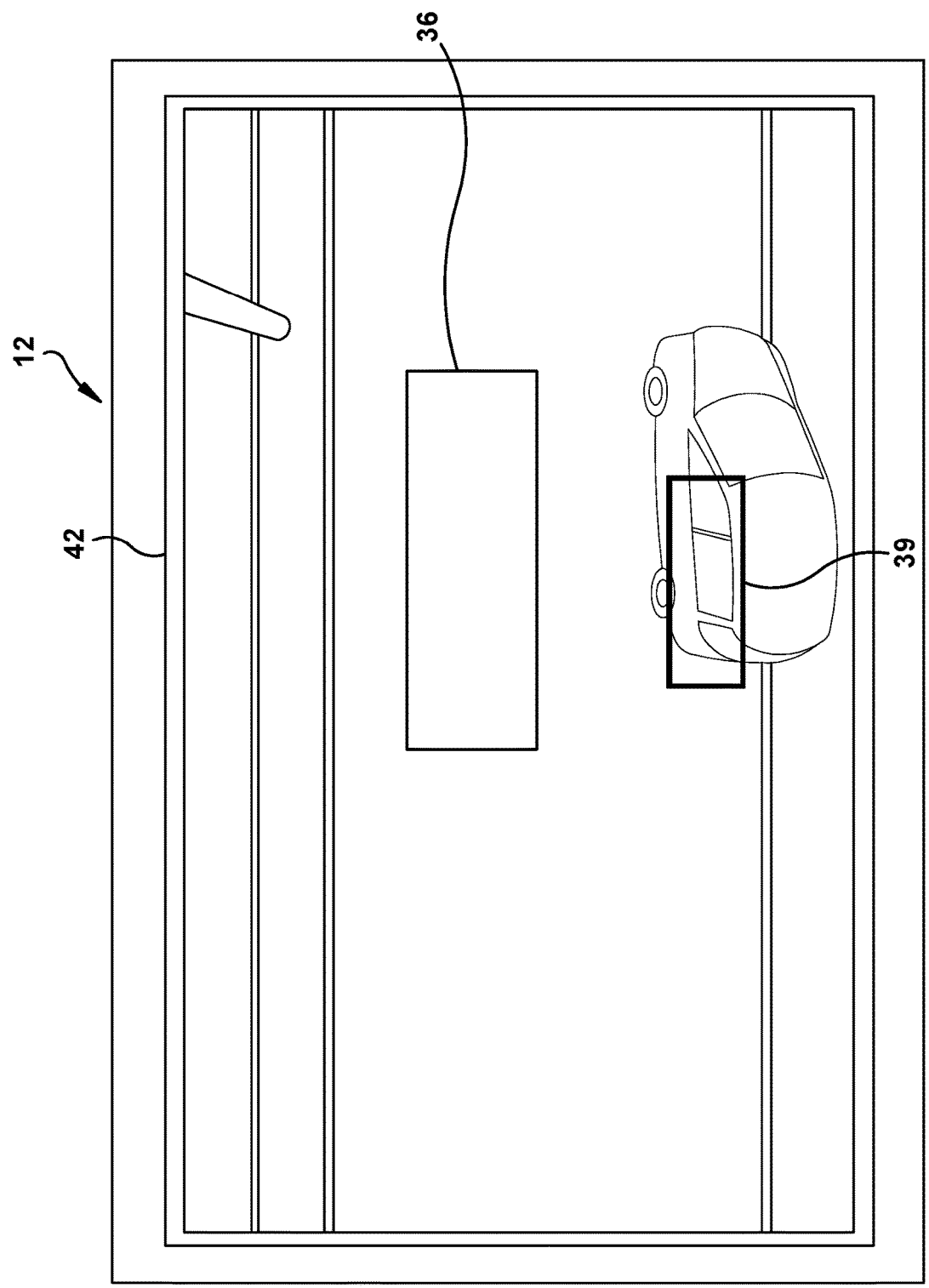

In FIG. 10, the first image generator 28 is used to show the bird's eye image of the host vehicle with actual images produced by the cameras 16, 18, 20, 22 and synthesized by the first image generator 28. In this unified image, the screen 42 shows an image of vehicle object 39 with the perspective of looking at the roof of the vehicle object 39. The generally central portion 36 is white to clearly contrast with the surrounding bird's eye image. The generally central portion 36 may be left blank to promote "negative space" in order to draw attention to the more important information of the images of potential obstacles surrounding the host vehicle. In other words, by not showing the image of the host vehicle, the driver may focus on only the relevant, surrounding information.

Figure 11:
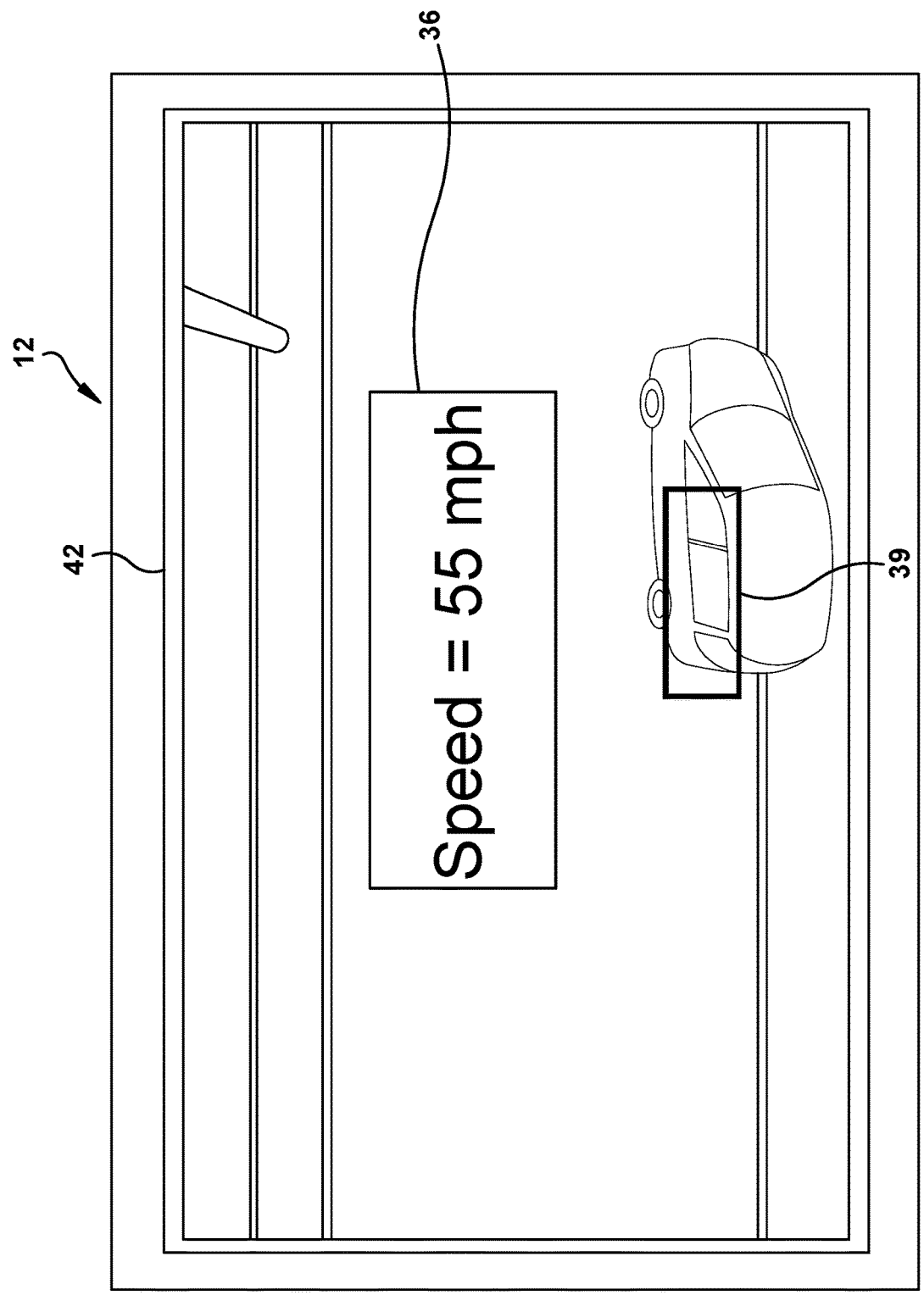

In FIG. 11, the first image generator 28 is used to show the bird's eye image of the host vehicle. In this unified image, the generally central portion 36 may be tinted so as to have less contrast with the surrounding bird's eye image. Additional information about the vehicle, such as the speed limit for the local area, may be displayed in different colors in the generally central portion 36. Different colors may be used to draw attention to the information in the generally central portion 36 according to the priority of the information. The colors may also be changed according to the time of day, interior lighting or the preference of the driver.

In a situation where the first image generator 28 is unable to display the bird's eye view, the second image generator 30 may still display vehicle information and warnings in the generally central portion 36 of the screen 42.

Figure 12:
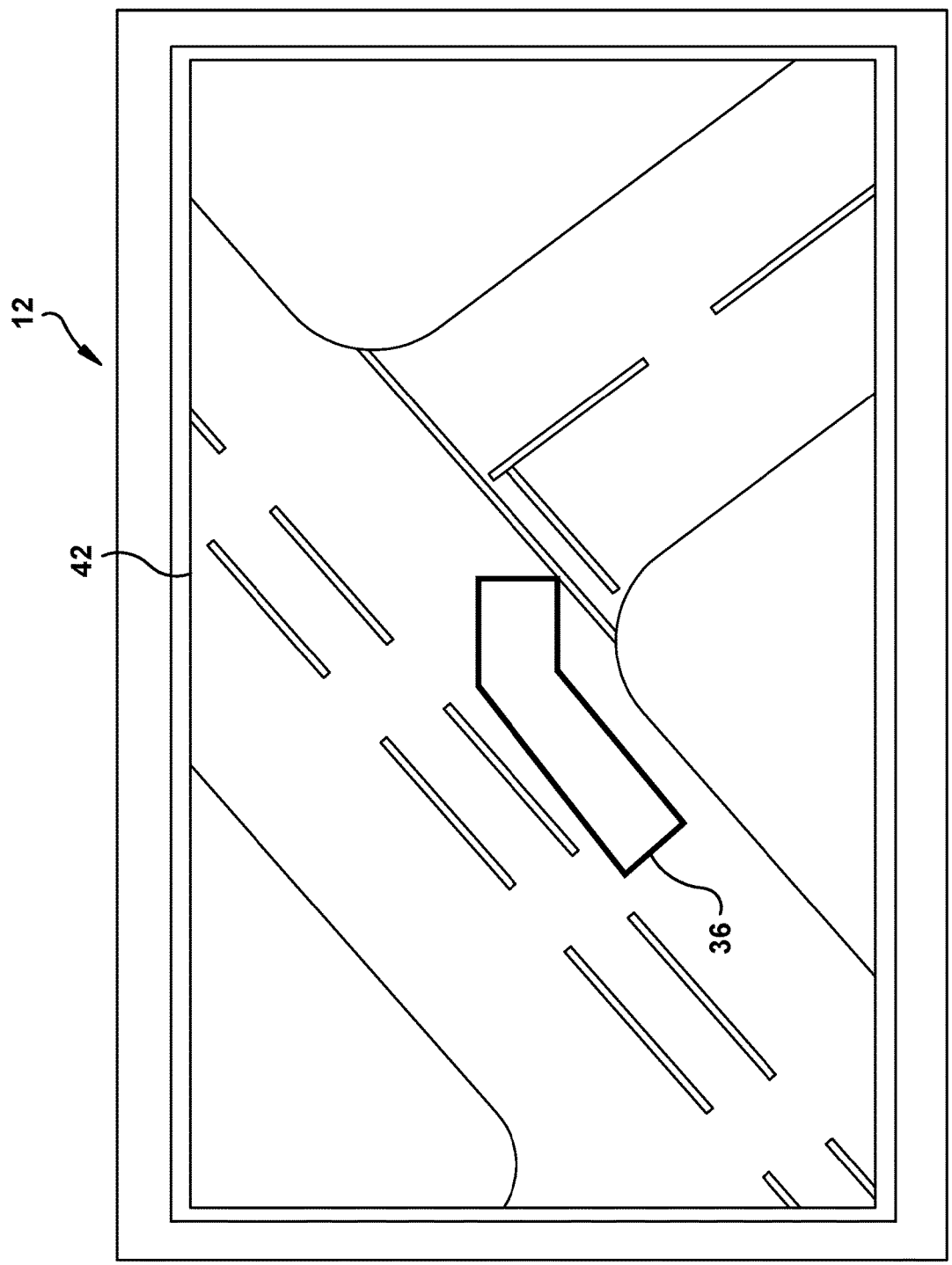

In FIG. 12, the first image generator 28 is used to show the bird's eye image of the host vehicle as it is approaching an intersection. In this example of a unified image, the generally central portion 36 is not used to display information but rather is shown as an outline of the host vehicle. The outline may be filled with a color similar to the pavement on which the host vehicle is traveling. FIG. 12 displays the bounds of the unviewable area with the minimal required spatial information, as the location of the front and rear of the host vehicle are understood. This display offers minimal distraction by using the same gray inside the vehicle outline as outside the vehicle outline. The coloring may be determined by looking at the average gray level or color along the viewable boundary. The color may also be predicted by using the background from previous frames when the host vehicle was in a different position. Gradient shading inside the outline may be used, for example if the nose is assigned a brighter color than the end, the coloring may be modulated to a darker coloring at the end of the outline. Gradient shading and smooth boundary matching may be done via interpolation. Alternatively, the second image generator 30 may utilize what is at the boundaries of the unviewable space in the bird's eye image and sytnthesize an image near to what the image would look like if the vehicle was not present. Otherwise, the generally central section 36 displays no other information about the host vehicle and is not representing the vehicle in any manner except by its general shape.

Each generally central portion 36 as depicted in FIGS. 3-12 may change according to the task the driver is completing, the driver status or driver preference.

Figures 13, 14:
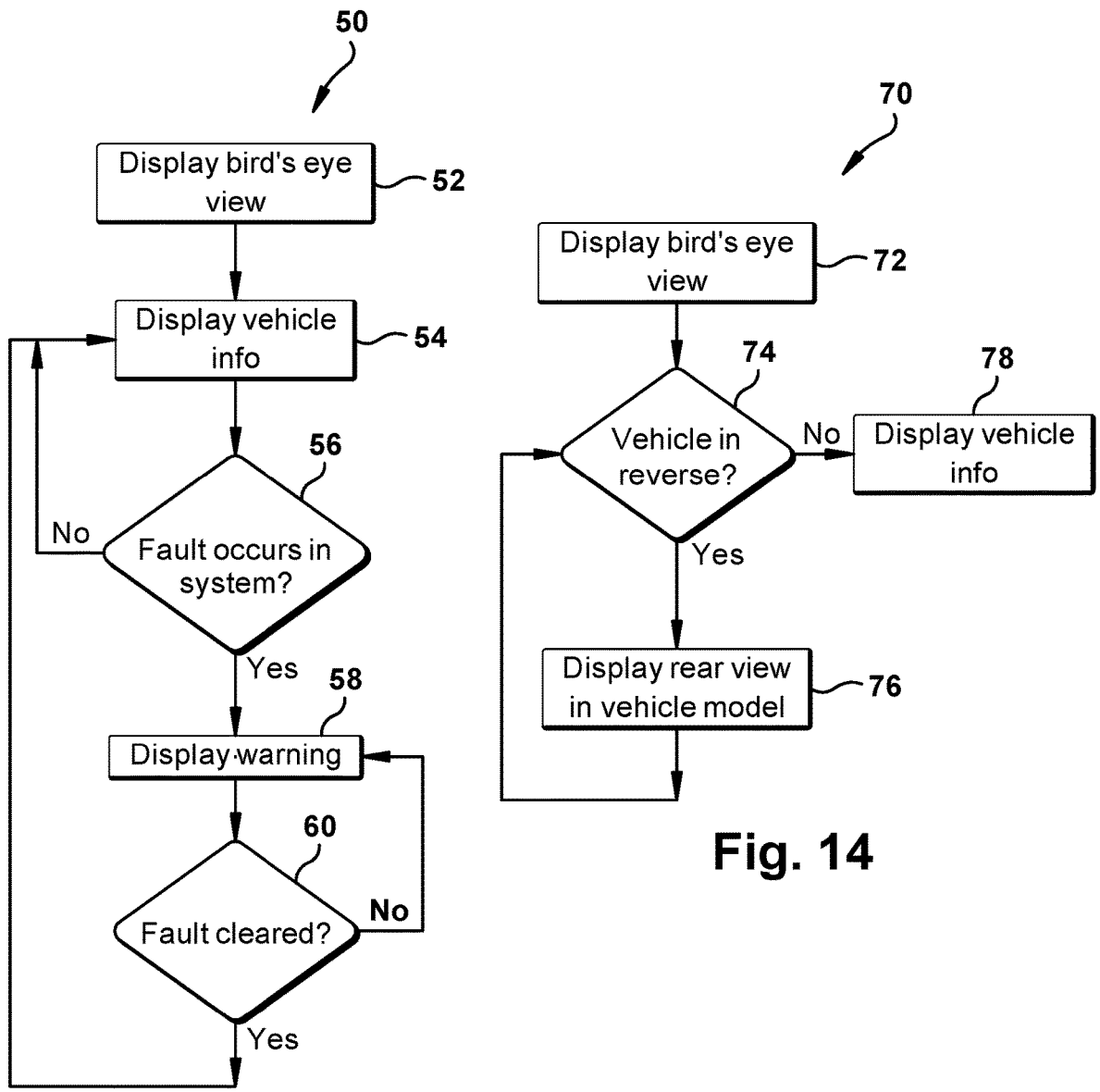
FIGS. 13-14 illustrate methods of utilizing the display according to examples of this invention.

FIG. 13 illustrates a method 50 of synthesizing and displaying an image. In step 52, the bird's eye image of the host vehicle as generated by the first image generator 28 of the surround view system 10 is displayed on the screen 42. In step 54, basic vehicle and ambient information, such as vehicle speed and temperature, is displayed in the generally central portion 36 of the display by the second image generator 30, similar to FIG. 5.

In step 56, the control logic 15 determines if a fault occurred anywhere in the host vehicle via messages on the vehicle communications bus 13. If there are no faults in the host vehicle, the method 50 returns to step 54 to continue to display the basic vehicle and ambient information. If the controller 14 receives a message that the host vehicle has a fault, the method 50 continues to step 58. In step 58, the second image generator 30 displays the fault, such as the low tire pressure warning, similar to FIG. 7. The driver input device 26 may be disabled so that the driver cannot change the images on the display 12.

In step 60, the controller 14 determines if the fault has been cleared. Once the fault has been cleared, the method 50 returns to step 54 to display the vehicle and ambient information. The driver may then use the input device 26 to change the display as she chooses. If the fault has not been cleared, the method 50 returns to step 58 to continue to display the warning.

FIG. 14 illustrates another method 70 of changing the view in the display screen 42. In step 72, the bird's eye view of the vehicle as generated by the first image generator 28 is displayed on the screen 42. In step 74, the control logic 15 determines if the vehicle is in reverse gear, either by its own sensors, cameras 16, 18, 20, 22 or by means of receiving a message on the vehicle communications bus 13. If the host vehicle is not in reverse gear, the basic vehicle and ambient information is displayed in generally central portion 36 in step 78, similar to FIG. 5.

If the vehicle is in reverse gear, then in step 76 the information from the alternate camera 24 is displayed by the second image generator in the generally central portion 36, similar to FIG. 9. The alternate camera 24 in this example is a backup camera. The method 60 returns to step 74 where the rear view image will continue to be displayed in generally central portion 36 as long as the host vehicle is in reverse gear.

In most situations, the driver of the host vehicle can modify the view in the generally central portion 36 by using the driver input device 26. However, if an alert or warning message is generated, the control logic 15 can prevent the driver from changing the view back to the basic vehicle information or alternate camera view until the driver alert or warning is addressed.

In addition, the control logic 15 can save the composite image generated by the first image generator 28 and second image generator 30 exactly as how the image would have appeared on the screen 42 to the driver. The control logic 15 no longer saves "empty space" or unviewable space by saving the representative images of the top view or roof of a host vehicle, but rather saves the images generated by the second image generator 30 on the screen 42 in the generally central portion 36. No additional frames are needed to capture warnings or other information that may have previously been on a separate display. Relevant information will not be lost due to the display switching between the bird's eye view and the warning screens, as in the prior art.

Therefore, a method for synthesizing an image comprises receiving a bird's eye view of a surrounding of a vehicle from a first set of cameras and synthesizing the bird's eye view to create a bird's eye image having a generally central portion. The method also includes receiving a second view separate from the bird's eye view and synthesizing the second view to create a second image. The method includes displaying the second image within the generally central portion of the bird's eye image.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A controller for synthesizing images for a display comprising:
    a first image generator for generating a bird's eye image from a first set of cameras by stitching together views from the first set of cameras, the bird's eye image depicting surroundings of a host vehicle and having a generally central portion representing space unviewed by the first set of cameras, wherein the generally central portion has two segments, a first segment approximating a location of a tractor of the host vehicle and a second segment approximating a location of a trailer of the host vehicle;
    a second image generator for generating a second image separate from the bird's eye image; wherein the second image is displayed in the second segment of the generally central portion; and
    a synthesizer for synthesizing the bird's eye image and the second image for displaying the second image within the generally central portion of the bird's eye image as a negative space by the second image generator; wherein the first segment changes position on the display in response to the tractor moving out of an alignment with the trailer.

2. The controller as in claim 1, wherein the generally central portion is placed at a location of a body of the host vehicle with respect to the views of the first set of cameras.

3. The controller as in claim 1, wherein the second image comprises a view from a camera, separate from the first set of cameras, having one of a driver facing camera view; an undercarriage camera view, a back-up camera view and a forward camera view.

4. The controller as in claim 1, wherein the second image comprises at least one of an informational display and a diagnostic display.

5. The controller as in claim 1, further comprising an operator input device, the operator input device controllable to change the second image.

6. The controller as in claim 1, wherein the second image is displayed entirely within the generally central portion of the bird's eye image.

7. The controller as in claim 1, wherein the controller is in communication with a display screen and the synthesizer transforms the display screen to display a unified image in response to synthesizing the bird's eye image and the second image.

8. A method for synthesizing an image comprising:
    stitching together views captured from a first set of cameras to create a bird's eye view based on a known relative position between the first set of cameras;
    receiving the bird's eye view of a surrounding of a vehicle from the first set of cameras;
    synthesizing the bird's eye view to create a bird's eye image having a generally central portion representing space unviewed by the first set of cameras, wherein the generally central portion is displayed as a negative space and has two segments, a first segment approximating a location of a tractor of the vehicle and a second segment approximating a location of a trailer of the vehicle;
    receiving a second view separate from the bird's eye view; synthesizing the second view to create a second image;

displaying the second image within the second segment of the generally central portion of the bird's eye image; and changing a position of the first segment in response to the tractor moving out of an alignment with the trailer.

9. The method as in claim 8, further comprising recording the synthesized bird's eye image and the second image.

10. The method as in claim 8, further comprising manually changing the second view from one of an informational view, a back-up camera view, a driver facing camera view, a forward view.

11. The method as in claim 8, further comprising transforming a display screen to display the bird's eye view and the second image as a unified image.

12. A system for synthesizing and displaying an image comprising:
a first set of cameras for capturing a bird's eye view of a surrounding of a vehicle; a controller, the controller capable of:
stitching together views captured from the first set of cameras to create the bird's eye view;
synthesizing the bird's eye view to create a bird's eye image having a generally central portion representing space unviewed by the first set of cameras, wherein the generally central portion has is displayed as a negative space and has two segments, a first segment approximating a location of a tractor of the vehicle and a second segment approximating a location of a trailer of the vehicle; and
synthesizing a second image, wherein the second image is placed in the second segment of the generally central portion of the bird's eye image to create a unified image, wherein the first segment changes position in response to the tractor moving out of an alignment with the trailer; and a display for displaying the unified image.

13. The system as in claim 12, wherein the second image is synthesized from another controller on the vehicle.

14. The system as in claim 12, wherein the second image is synthesized from a second view received from a camera separate from the first set of cameras.

* * * * *